No. 866,428. PATENTED SEPT. 17, 1907.
M. H. BROWNING.
CLEVIS.
APPLICATION FILED MAR. 21, 1907.
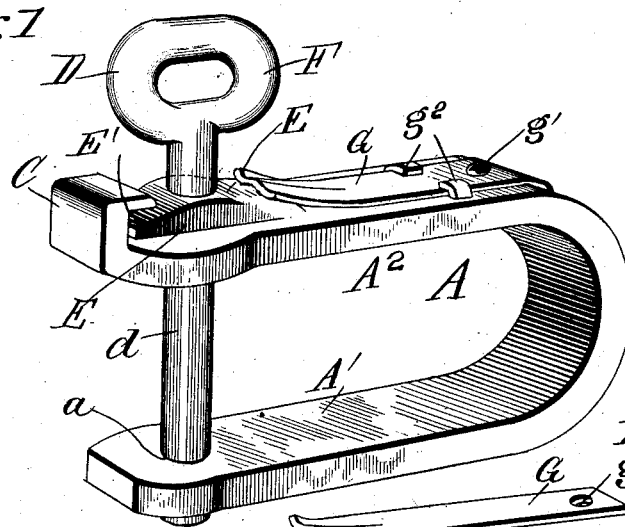
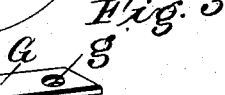
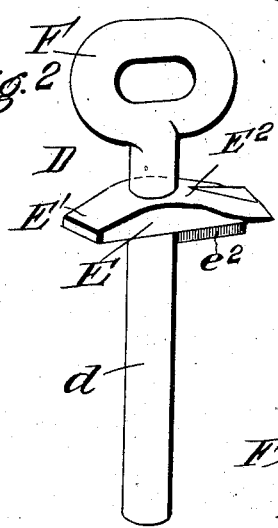
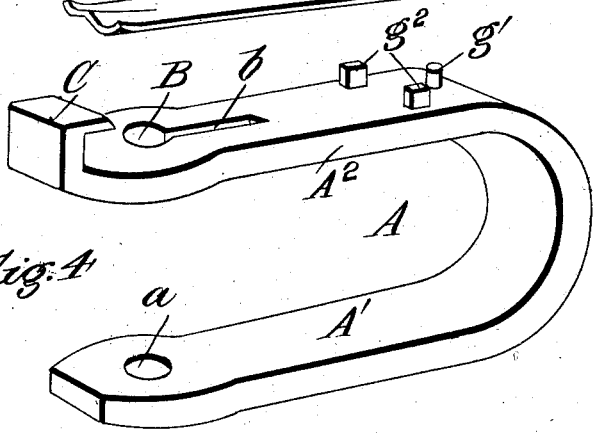
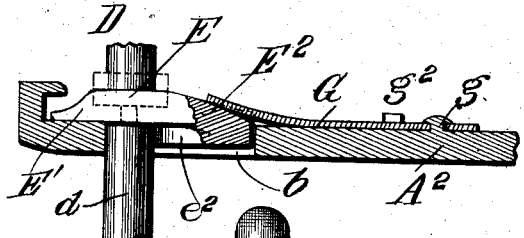
WITNESSES
INVENTOR
MELVIN H BROWNING
BY
ATTORNEYS

UNITED STATES PATENT OFFICE.

MELVIN H. BROWNING, OF PERRY, ILLINOIS.

CLEVIS.

No. 866,428.   Specification of Letters Patent.   Patented Sept. 17, 1907.

Application filed March 21, 1907. Serial No. 363,627.

*To all whom it may concern:*

Be it known that I, MELVIN H. BROWNING, a citizen of the United States, and a resident of Perry, in the county of Pike and State of Illinois, have invented an Improved Clevis, of which the following is a specification.

My invention is an improvement in clevises, and consists in certain novel constructions and combinations of parts as will be hereinafter described and claimed.

In the drawing, Figure 1 is a perspective view of a clevis embodying my invention. Fig. 2 is a detail perspective view of the pin. Fig. 3 is a detail perspective view of the spring. Fig. 4 is a detail perspective view of the clevis yoke. Fig. 5 is a detail sectional view showing the pin lug engaged with the yoke of the clevis, and Fig. 6 is a detail edge view of the pin.

The yoke A is generally of ordinary form and has its lower arm A' provided with an opening $a$. Its upper arm $A^2$ is provided with an opening B and a slot $b$ leading in one direction therefrom, and on the opposite side of the opening B from the slot $b$, the said upper arm has a keeper C which opens toward the opening B and forms a seat beneath which one end of the lug on the pin engages when the pin is locked as shown in Fig. 1.

The pin D has its shank $d$ adapted to enter the openings B and $a$ when applied as in Fig. 1, and is provided with a lug E and above it with a handle F.

The lug E has an arm E' and an oppositely projecting arm $E^2$. The arm E' projects into the keeper C when the pin is locked, and the arm $E^2$ has on its under side a projection or rib $e^2$ which fits in the slot $b$ in which it is held by the pressure of the spring G held at one end to the arm $A^2$ and bearing at its free end on the arm $E^2$ and preferably creased at such end to receive a rib on the said arm to prevent any accidental turning of the pin should it be forced up accidentally in the use of the device. In securing the spring to the yoke arm $A^2$ it has an opening $g$ receiving the pin $g'$ and projects between two lugs $g^2$ on the malleable casting which are hammered from the position shown in Fig. 4 to that shown in Fig. 1, after the spring has been applied, overlying and securing the same, as will be understood from Figs. 1 and 4.

The keeper C operates to prevent strain on the spring in removing or in case any sudden upward movement is given the pin. It will be noticed, however, that the keeper C is sufficiently above the arm E' to permit the pin to be lifted to raise its rib $e^2$ out of slot $b$ so the pin can then be turned a quarter around to the position indicated in dotted lines Fig. 5, in which position the pin can be inserted in or removed from the yoke. When in the position shown in Figs. 1 and 5, the pin will be held from turning in the yoke, so that all wear instead of coming upon the metal as would occur if the clevis turned on the pin, will come on the wood through which the pin passes, which is important, as iron against wood is durable, while iron working against iron will soon wear out, so I make the improved clevis so the pin cannot turn in the yoke with the motion of the evener.

I claim:

1. A clevis comprising a yoke having its arms provided with openings for the pin and having a slot leading from the upper pin opening and a keeper on the opposite side of said opening from such slot, the pin having oppositely projecting arms overlying the upper yoke arm, one of said arms being arranged to enter the keeper and the other arm having on its underside a projection entering the slot in the upper yoke arm and a spring secured to the yoke arm and bearing upon the pin arm, substantially as set forth.

2. A clevis comprising a yoke, a double armed pin fitted thereto, a keeper rigid with the yoke and overlying one arm of the pin, and a spring operating upon the other arm of the pin.

3. The combination of the yoke arm having an opening and slot at one side thereof, of a pin fitting in said opening and having an arm provided with a projection entering said slot, and a spring operating to depress the arm and hold the projection in its slot, substantially as set forth.

4. The combination of the yoke arm having a pin opening and a keeper at one side of the same, the pin having an arm projecting in said keeper and adapted to be moved below the keeper to secure the pin or clear of the keeper to release the pin and a spring acting on the pin, substantially as set forth.

5. The yoke arm having a pin opening, the pin having an arm and a projection depending therefrom to engage the yoke arm and adapted to prevent the turning of the pin and a spring acting on the pin, substantially as set forth.

6. The combination of the yoke arm, the pin having an arm and a spring secured at one end to the yoke arm and bearing at its other end on the pin arm, the latter and the spring being provided one with a depression and the other with a part entering the same and arranged eccentrically to the pin, substantially as set forth.

7. A clevis yoke having one of its arms provided with a pin opening and a slot leading from one side of the same and with a keeper on the opposite side of the arm and a pin coöperating with said yoke arm, substantially as set forth.

8. A clevis pin and yoke therefor having means for interlocking with the pin, the latter turning into and out of interlock with the yoke, and a spring for holding the pin in interlock with the yoke.

MELVIN H. BROWNING.

Witnesses:
HARVEY LIX,
JNO. E. MORTON.